(12) United States Patent
Cheng et al.

(10) Patent No.: US 11,718,422 B2
(45) Date of Patent: Aug. 8, 2023

(54) SYSTEMS AND METHODS FOR SATELLITE MOVEMENT

(71) Applicant: Maxar Space LLC, Palo Alto, CA (US)

(72) Inventors: Haifei Cheng, Mountain View, CA (US); Timothy Lofquist, Sunnyvale, CA (US)

(73) Assignee: Maxar Space LLC, Palo Alto, CA (US)

( * ) Notice: Subject to any disclaimer, the term of this patent is extended or adjusted under 35 U.S.C. 154(b) by 340 days.

(21) Appl. No.: 17/038,213

(22) Filed: Sep. 30, 2020

(65) Prior Publication Data

US 2022/0097873 A1    Mar. 31, 2022

(51) Int. Cl.
| | | |
|---|---|---|
| *B64G 1/26* | (2006.01) | |
| *B64G 1/40* | (2006.01) | |
| *B64G 1/10* | (2006.01) | |
| *B64G 1/24* | (2006.01) | |

(52) U.S. Cl.
CPC ............. *B64G 1/26* (2013.01); *B64G 1/10* (2013.01); *B64G 1/40* (2013.01); *B64G 2001/247* (2013.01)

(58) Field of Classification Search
CPC ...... B64G 1/10; B64G 2001/247; B64G 1/26; B64G 1/40

USPC ......................................................... 244/169
See application file for complete search history.

(56) References Cited

U.S. PATENT DOCUMENTS

| | | | |
|---|---|---|---|
| 5,646,847 A | 7/1997 | Ratan et al. | |
| 2004/0069905 A1 | 4/2004 | Goodzeit et al. | |
| 2008/0093506 A1* | 4/2008 | Emsellem | F03H 1/0081 244/173.1 |
| 2009/0157236 A1* | 6/2009 | Van Gaasbeck | G05B 15/02 701/3 |
| 2018/0251240 A1 | 9/2018 | Reitman et al. | |

* cited by examiner

*Primary Examiner* — Brady W Frazier
(74) *Attorney, Agent, or Firm* — Vierra Magen Marcus LLP

(57) ABSTRACT

A satellite includes a plurality of thrusters disposed about the satellite, each of the plurality of thrusters having a minimum thruster firing time, and a control circuit connected to the plurality of thrusters. The control circuit is configured to identify violations of the minimum thruster firing time in a non-compliant thruster firing pattern selected to achieve a specified movement, generate a plurality of compliant thruster firing patterns by replacing each of the violations of the non-compliant thruster firing pattern by zero and a minimum time in different combinations, select a compliant thruster firing pattern from the plurality of compliant thruster firing patterns to produce a satellite movement that is within a predetermined range of the specified movement, and cause the plurality of thrusters to fire according to the compliant thruster firing pattern.

20 Claims, 13 Drawing Sheets

$$\begin{bmatrix} du_x \\ du_y \\ du_z \\ d\omega_x \\ d\omega_y \\ d\omega_z \end{bmatrix} = \begin{bmatrix} M_{6\times 12} \end{bmatrix} \begin{bmatrix} T_1 \\ T_2 \\ T_3 \\ T_4 \\ T_5 \\ T_6 \\ T_7 \\ T_8 \\ T_9 \\ T_{10} \\ T_{11} \\ T_{12} \end{bmatrix}$$

SYSTEMS AND METHODS FOR SATELLITE MOVEMENT

This invention was made with government support under OSAM-1 awarded by the National Aeronautics and Space Administration (NASA). The government has certain rights to the invention.

BACKGROUND

The present disclosure relates to technology for satellite movement.

Satellites are widely used for a variety of purposes including communication, location (e.g. Global Positioning System, or GPS), and data gathering (e.g. directing sensors at the Earth including cameras, radar, laser, or other sensors). Different satellites may include different equipment according to the functions they are to fulfill. Satellites may be placed in orbit at different heights above the Earth and may be adapted for the location at which they are expected to operate. For example, Geostationary satellites may be different from Low Earth Orbit (LEO) satellites. In order to fulfill their functions, satellites may be maintained in a designated position with a designated orientation for long periods of time (e.g. throughout their working life) or change position and/or orientation one or more times. In some cases, a satellite may drift from its designated orbit and/or orientation and may be returned to its designated orbit and/or orientation by some movement of the satellite that may be linear (e.g. along x, y, z coordinates) and/or rotational (e.g. rotation about x, y, z coordinates). In some cases, a satellite may be moved in a linear and/or rotational manner to perform some new function (e.g. directing one or more antenna, sensor, or other component towards a different location). Satellites may be moved from their designated orbits at the end of their useful life. Such movement may be achieved using thrusters that are fired as required to achieve a specified movement.

DETAILED DESCRIPTION

Certain embodiments of the present technology described herein relate to satellites and to thrusters used to move satellites while in space. Satellites may be moved for a variety of reasons while in space. A satellite may include thrusters configured to achieve such movement. Thrusters may be controlled by a control circuit which causes the thrusters to fire according to a thruster firing pattern in order to achieve a specified movement. Some thrusters may have physical characteristics that make short thruster firing times problematic or impossible (e.g. valves may require a certain amount of time to turn on/off). A thruster firing pattern (e.g. a thruster firing solution obtained for a given specified movement) may include one or more short thruster firing times. While such short thruster firing times in a thruster firing pattern may be ignored in some cases (e.g. because little thrust is developed in such short periods), they may have a significant effect where fine movement of a satellite is required and, in some cases, repeatedly firing or attempting to fire a thruster for short periods may cause damage.

In some cases, when a thruster firing pattern is found to have one or more short thruster firing times (e.g. a violation of a minimum thruster firing time), each violation may be replaced by zero and the minimum thruster firing time. Thus, for each violation there are two possibilities and with N such violations in a non-compliant thruster firing pattern there are $2^N$ combinations each of which is a compliant thruster firing pattern that complies with the minimum thruster firing time. One of these compliant thruster firing patterns may be selected instead of the non-compliant thruster firing pattern. For example, a compliant thruster firing pattern may be selected that produces a movement that is within a predetermined range of the specified movement.

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
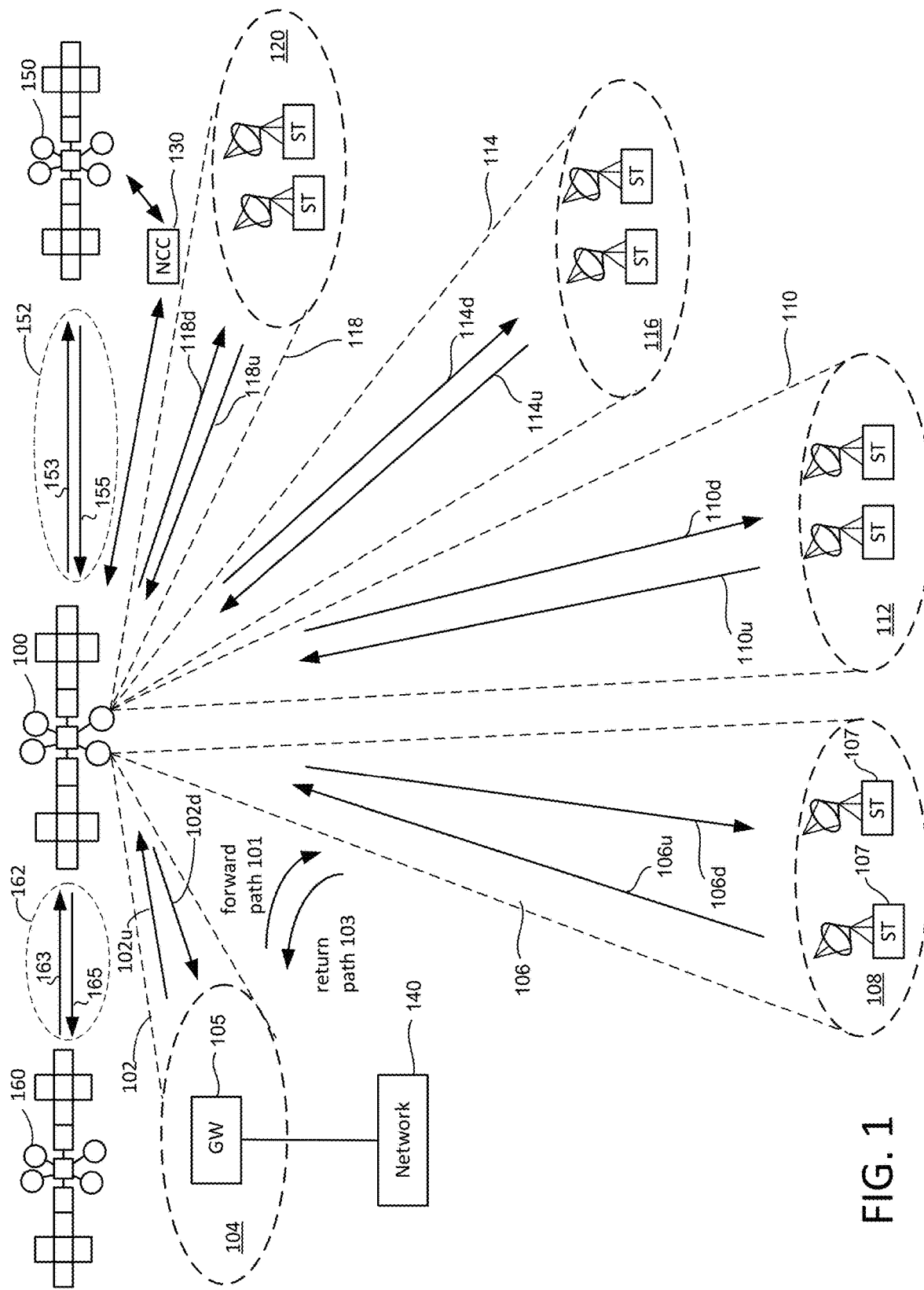
FIG. 1 is a block diagram describing a wireless communication system, which may be a satellite communication system.

FIG. 1 depicts a block diagram of a wireless communications system that includes a communication platform, satellite 100, which may be located, for example, at a geostationary or non-geostationary orbital location. Where a satellite is in a non-geostationary orbit, the satellite may be a low earth orbit (LEO) satellite. Satellite 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the satellite 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. In accordance with certain embodiments, it is possible that a subscriber terminal with which one satellite wirelessly communicates is on a platform of or on another satellite.

In one embodiment, satellite 100 comprises a bus (e.g., spacecraft) and one or more payloads (e.g., the communication payload, an imaging payload, etc.). The satellite may also include a command and data handling system and multiple power sources, such as batteries, solar panels, and one or more propulsion systems, for operating the bus and the payload. The command and data handling system can be used, e.g., to control aspects of a payload and/or a propulsion system, but is not limited thereto.

The at least one gateway 105 may be coupled to a network 140 such as, for example, the Internet, terrestrial public switched telephone network, mobile telephone network, or a private server network, etc. Gateway 105 and the satellite 100 communicate over a feeder beam 102, which has both a feeder uplink 102$u$ and a downlink 102$d$. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals. In certain embodiments, the feeder uplink 102$u$ is an optical beam, such as a laser beam generated by a laser source. Such a laser beam may be in the visible spectrum, or in the infra-red or ultra-violet ranges. In other embodiments, the feeder uplink 102$u$ is an RF beam. Similarly, it is possible that the downlink 102$d$ is an optical beam or an RF beam, depending upon the embodiment.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106$u$, 110$u$, 114$u$, 118$u$) and a downlink (106$d$, 110$d$, 114$d$, 118$d$) for communication between subscriber terminals ST and satellite 100. Although FIG. 1 only shows two subscriber terminals within each region 108, 112, 116 and 120, a typical system may have thousands of subscriber terminals within each region. In the embodiments described herein, it is assumed that the service beams (both downlink and uplink) are RF beams, as opposed to optical beams.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via feeder uplink 102$u$ of feeder beam 102, through a first signal path on satellite 100, and from satellite 100 to one or more subscriber terminals ST via downlink 106$d$ of service beam 106. An uplink (e.g., 102$u$) of a feeder beam (e.g., 102) can also be referred to more succinctly as a feeder uplink beam, and the downlink (e.g., 106$d$) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106$u$ of service beam 106, through a second signal path on satellite 100, and from satellite 100 to gateway 105 via downlink 102$d$ of feeder beam 102. An uplink (e.g., 106$u$) of a service beam (e.g., 106) can also be referred to more succinctly as a service uplink beam, and the downlink 102$d$ of feeder beam 102 can also be referred to more succinctly as a feeder downlink beam. Although the above example uses service beam 106, the example could have used any service beam. In other examples, communication between subscriber terminals or other ground equipment may go through one or more satellites without going through a gateway.

FIG. 1 also shows that the satellite 100 can communicate with other satellites 150 and 160 over respective intersatellite link (ISL) beams 152 and 162. For example, the satellite 100 can send data to the satellite 150 over a path 153 of the ISL beam 152, and can receive data from the satellite 150 over a path 155 of the ISL beam 152. Communication over a forward path can comprise, for example, transmitting data from the gateway 105 to the satellite 100 via the feeder uplink 102$u$, through a signal path on satellite 100, and from the satellite 100 to the satellite 150 via the path 153 of the ISL beam 152, through a signal path on the satellite 150, and then to one or more subscriber terminals ST via a service downlink beam. Communication over a return path can comprise, for example, transmitting data from a subscriber terminal to the satellite 150 via a service uplink beam, through a signal path on the satellite 150, and from the satellite 150 to the satellite 100 via the path 155 of the ISL beam 152, and from the satellite 100 to the gateway 105 via downlink 102$d$. In still another example, the satellite 100 can receive data over a path 163 of the ISL beam 162 from the satellite 160, and can send data over a path 153 of the ISL beam 152 to the satellite 150. These are just a few examples of how a ground based gateway can communicate with satellites, satellites can communicate with one another, and how satellites can communicate with service terminals STs, which examples not intended to be all encompassing. All of the satellites 100, 150 and 160 shown in FIG. 1 can be in a geostationary orbit. Alternatively, all of the satellites 100, 150 and 160 shown in FIG. 1 can be in a non-geostationary orbital, e.g., in a low earth orbit (LEO), and such satellites may only send an optical ISL beam from one satellite to another when the other satellite comes into the view of the optical coverage area of the satellite. It is also possible that one or more of the satellites 100, 150 and 160 shown in FIG. 1 can be in a geostationary orbit, while one or more of the other satellites is within a non-geostationary orbital, e.g., in a low earth orbit (LEO FIG. 1 also shows a Network Control Center (NCC) 130, which can include an antenna and modem for communicating with satellites 100, 150 and 160, as well as one or more processors and data storage units. Network Control Center 130 provides commands to control and operate satellites 100, 150 and 160. Network Control Center 130 may also provide commands to any of the gateways and/or subscriber terminals. It is also possible that the NCC includes transmitter and/or receiver optics for optically communicating with satellites 100, 150 and 160 or communicates with satellites 100, 150, and 160 through the optical gateway links such as feeder beam 102.

The architecture of FIG. 1 is provided by way of example and not limitation. Embodiments of the disclosed technology may be practiced using numerous alternative implementations including satellites and satellite systems that have primary purposes other than communications.

Figure 2:
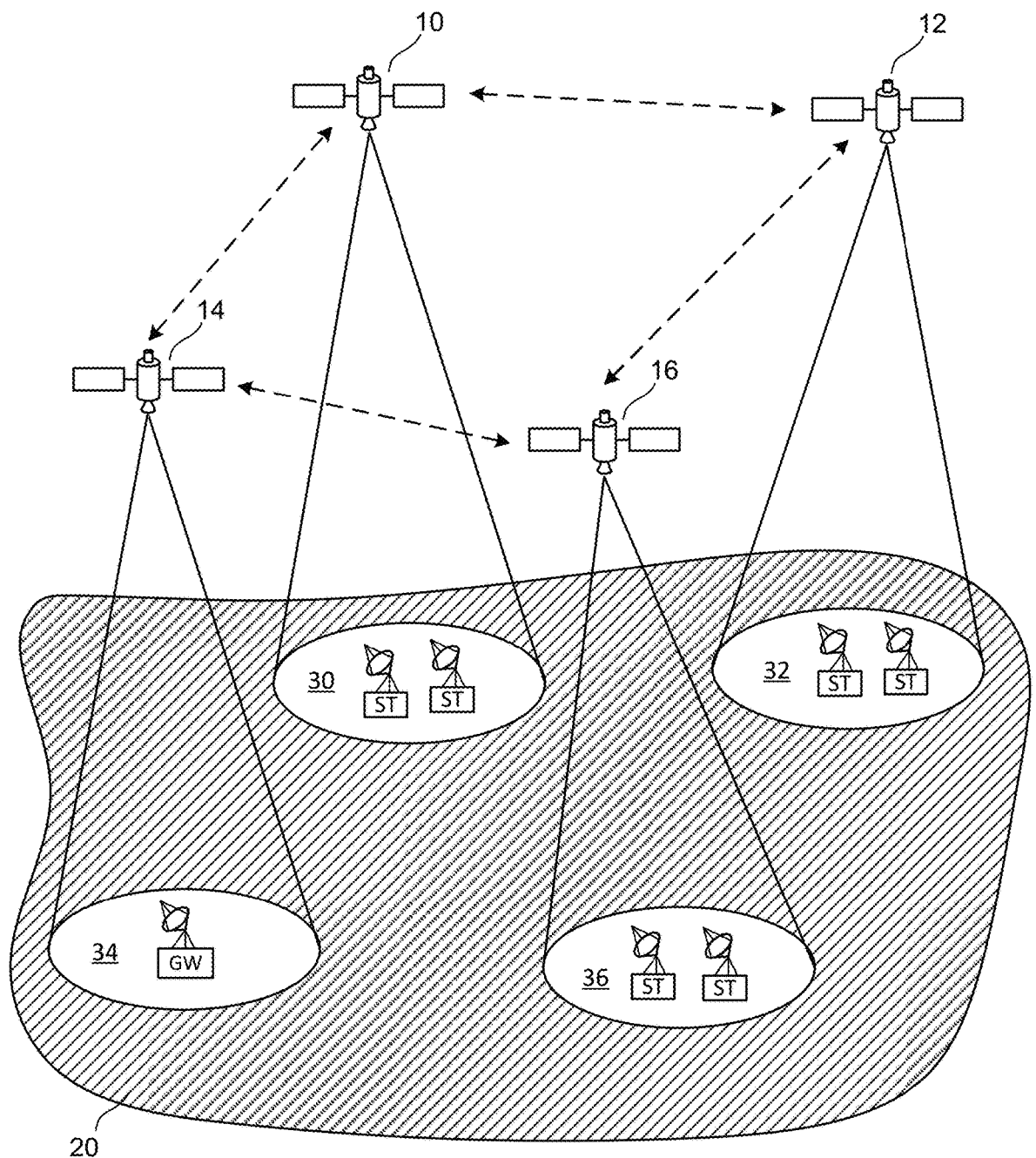
FIG. 2 depicts a portion of a satellite communication system.

FIG. 2 depicts a portion of satellite communications system that includes communication between satellites and ground terminals as well as communication between satellites. The satellite communications system includes satellites 10, 12, 14 and 16. In some embodiments, the satellite communication system will include more or less than four satellites. The four satellites of FIG. 2 are only a subset of satellites in one example of a satellite communication system. Shaded region 20 represents a portion of the surface of the Earth that is being serviced by satellites 10, 12, 14 and 16 at the moment in time depicted in FIG. 2. Satellite 10 is servicing region 30 with one or more spot beams. Satellite 12 is serving region 32 with one or more spot beams. Satellite 14 is servicing region 34 with one or more spot beams. Satellite 16 is servicing region 36 with one or more spot beams. Each of the regions 30, 32, 34 and 36 include many subscriber terminals ST and one or more gateways GW. For example, purposes only, FIG. 2 shows two subscriber terminals ST in region 30, two subscriber terminals ST in region 32, two subscriber terminals ST in region 36, and one gateway GW in region 34. However, each of the regions depicted may have many ground terminals including subscriber terminals ST (e.g., thousands) and many gateways GW.

FIG. 2 also shows dashed arrows to indicate communication between the satellites. Each of the dashed arrows represent an inter-satellite link. For example, satellite 10 can directly communicate with satellites 12 and 14. Satellite 16 can directly communicate with satellites 12 and 14. For satellite 16 to communicate with satellite 10, messages have to be passed via satellite 12 or satellite 14. For example, a subscriber terminal ST in region 36 wishing to communicate with a subscriber terminal ST in region 30 will send a message to satellite 16, which will forward that message to satellite 12, which will forward that message to satellite 10, which will forward that message to the subscriber terminal ST in region 30. A subscriber terminal ST in region 30 wishing to communicate with a gateway GW in region 34 will send a message to satellite 10, which will forward that message to satellite 14, which will forward that message to the gateway GW in region 34.

Figure 3:
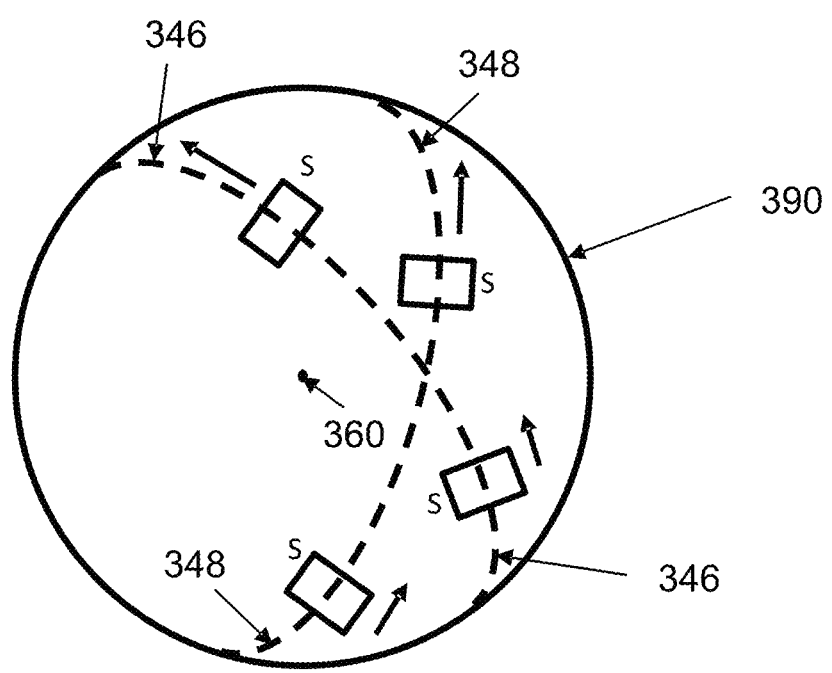
FIG. 3 shows an example of a satellite constellation orbiting the earth.

FIG. 3 depicts a constellation of satellites S in orbit around the Earth 390. In one embodiment, each of the satellites of the constellation depicted in FIG. 3 can be Low Earth Orbit (LEO) satellites. In other embodiments, the satellites can be Medium Earth Orbit (MEO) satellites. Other types of satellites (and other distances from the earth) can also be used. Surrounding the Earth 390 are a set of planes such as planes 346 and 348 shown in FIG. 3 (just two planes are shown for clarity, it will be understood that any suitable number of planes may be provided), each representing an orbit around the Earth. FIG. 3 also shows a plurality of satellites S representing the constellation of satellites. Each satellite of the constellation is orbiting the Earth 390 in one of the planes 346, 348. In one embodiment, the constellation of satellites S includes satellites 10, 12, 14 and 16 of FIG. 2. The arrangement of planes 346, 348 and other planes (not shown) may provide continuous coverage of the entire Earth, or a substantial portion of the Earth (e.g. omitting Arctic and Antarctic regions). Planes may form "streets of coverage" with satellites following each other as they orbit so that before a satellite disappears from view another satellite appears over the horizon.

The geographical location of a satellite S is given by (lons, lats) indicating the longitude and latitude of the location of satellite S. In one embodiment, it is assumed that the entire Earth (or portion of the Earth) is covered by logical locations of the satellites S. These logical locations are serviced by the nearest satellite S. The identity of a satellite is not permanently coupled with a current logical location, as the satellites are orbiting Earth and a current logical location for a satellite will be taken over by a successor satellite, which need not be in the same orbital plane. This is referred to as a handover.

The satellites S of the constellation depicted in FIG. 3 may be configured to wirelessly communicate with other satellites (e.g., neighbors) and/or ground terminals and/or gateways. Satellites S may be configured to gather data from antennas or sensors directed towards the Earth (e.g. cameras, or radiation detectors at any wavelength, infrared, radar, etc.). Satellites S may be configured to generate signals used to determine location (e.g. GPS) or other purposes.

A satellite S may be launched from Earth and placed in a desired orbit with a desired orientation to perform its function or functions (e.g. to maintain coverage of a designated area or areas as illustrated in FIG. 2). Over time, a satellite may drift from its desired orbit and/or orientation so that it can no longer perform its function(s) in a satisfactory manner. One or more thrusters may be provided to move such a satellite back to its desired orbit and/or orientation. Such thrusters may be fired according to a thruster firing pattern that is calculated to produce a specified movement to return the satellite to its desired orbit and/or orientation (orbital station-keeping).

In some cases, a satellite's desired orbit and/or orientation may change after it is launched (e.g. to perform some new function or to orient one or more satellite components towards a new target). Such a change or may require a movement of the satellite and a corresponding specified movement may be calculated and corresponding thruster firing pattern selected to achieve the specified movement (orbital maneuver).

In some cases, a service satellite may be used to service a target satellite to provide some external intervention. For example, a service satellite may dock with a target satellite so that it can refuel the target satellite (e.g. provide propellant and/or electrical current) and/or perform repair/replacement of components of the target satellite. In some cases, a service satellite may attach to a target satellite and may move the target satellite in a linear and/or rotational manner. In order to achieve a successful docking of a service satellite and target satellite, accurate movement of one or both may be required (e.g. to avoid damaging impact and/or misalignment, relative movement may be finely controlled).

The above examples of satellite movement (for returning to a desired orbit and/or orientation, changing to a new orbit and/or orientation, and facilitating docking of two or more satellites) should not be construed as limiting and the present technology may be applied to movement of a satellite or other spacecraft for any purpose.

Figure 4:
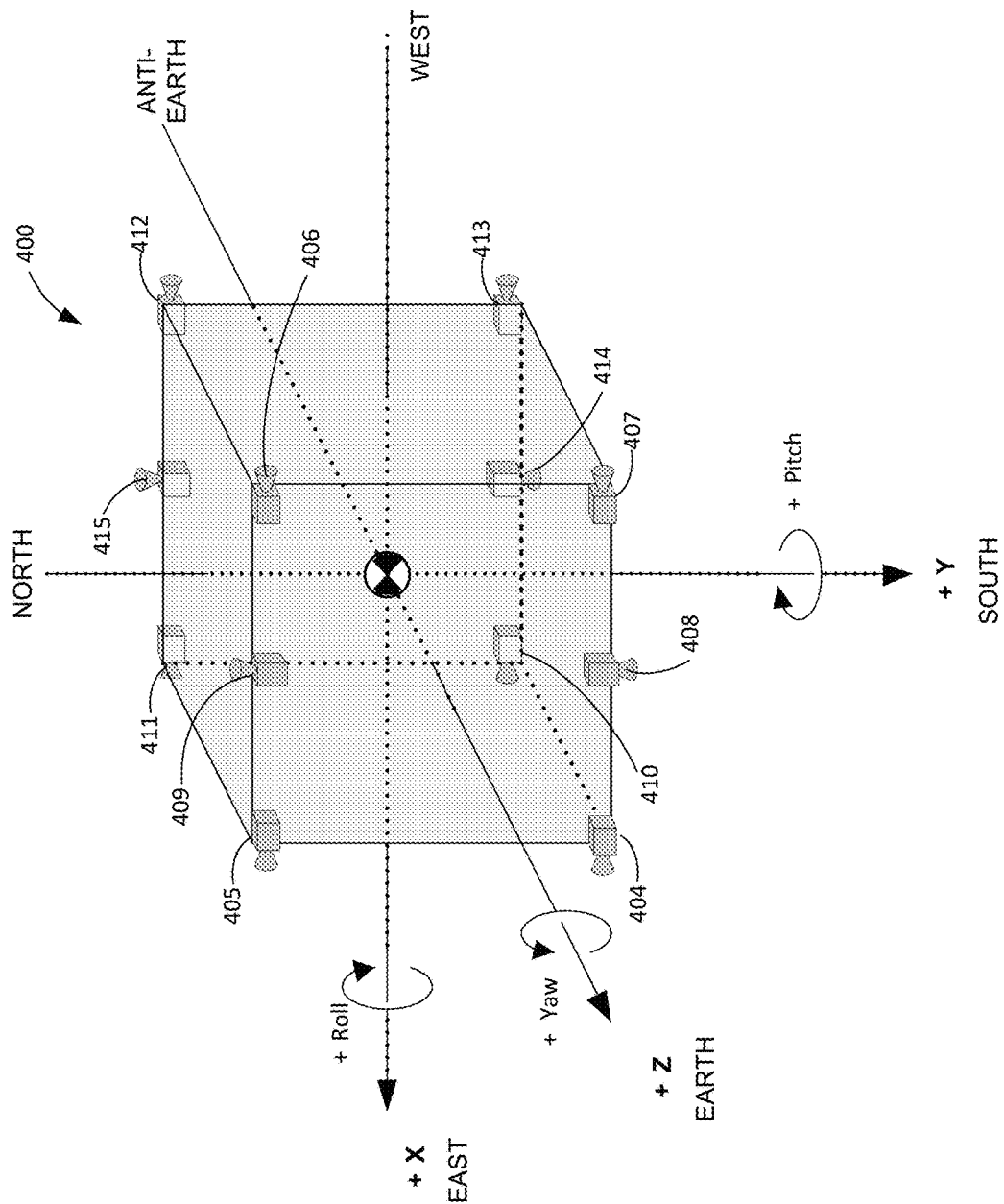
FIG. 4 shows an example of a satellite with thrusters.

FIG. 4 illustrates an example of a satellite 400 that includes a plurality of thrusters to facilitate movement of satellite 400, including linear movement and rotational movement. Satellite 400 is illustrated as a cube for simplicity (the present technology is not limited to any particular satellite shape or configuration and is not limited to a cube satellite or "CubeSat"). Thrusters may be physically attached to a frame, housing, or other component of satellite 400 so that force generated by thrusters results in movement of satellite 400.

Satellite 400 is shown in perspective view with the X-direction extending across the view shown from right to left (with the +X to the left). The X-direction is along the west to east direction in this example (e.g. parallel to a line of latitude). The Y-direction extends downwards in this view (with +Y towards the bottom). The Y-direction is along the north to south direction in this example (e.g. parallel to a line of longitude). The Z-direction extends generally from back to front in this view (with +Z towards the front). The Z-direction is along the anti-earth to earth direction in this example (e.g. directed towards the center of the earth). Movement along any combination of the X, Y, and/or Z directions (west-east, north-south, and/or earth/anti-earth) may be considered linear motion. Arrows indicating the X-direction, Y-direction, and Z-direction intersect in the center of satellite 400 in this example and these arrows also correspond to X, Y, and Z axes respectively for purposes of describing rotational movement. For example, rotation about the X-axis may be referred to as "roll," rotation about the Y-axis may be referred to as "pitch," and rotation about the Z-axis may be referred to as "yaw." Satellite 400 may experience linear movement in one or more of the three dimensions (along X, Y, Z directions) illustrated and rotational movement about any of the three axes illustrated (about X, Y, Z axes) so that satellite may be considered to have six degrees of freedom (6 DOF).

Twelve thrusters are provided to implement linear and rotational movement of satellite 400 (e.g. to provide movement with six degrees of freedom). Four thrusters are located at vertices of satellite 400 at corners of an earth-facing side, with east-facing thruster 404 at the southeast corner, east-facing thruster 405 at the northeast corner, west-facing thruster 406 at the northwest corner, and west-facing thruster 407 at the southwest corner. In addition, south-facing thruster 408 is located midway along the south edge and north-facing thruster 409 is located midway along the north edge of the earth-facing side. A similar arrangement is provided on the opposite side (anti-earth side) with east-facing thruster 410 at the southeast corner, east-facing thruster 411 in the northeast corner, west-facing thruster 412 in the northwest corner, and west-facing thruster 413 in the southwest corner. In addition, south-facing thruster 414 is located midway along the south edge and north-facing thruster 415 is located midway along the north edge of the anti-earth face. The number, locations, and orientations of thrusters in FIG. 4 are provided as an example and it will be understood that any suitable number of thrusters may be arranged in different locations and orientations according to the present technology. Furthermore, while satellite 400 is shown in a particular orientation, it will be understood that satellite 400 may be rotated to have a different orientation which may provide different thruster orientations (e.g. changing pitch by 90 degrees may bring thrusters 406, 407, 412, 413, which are shown as west-facing, into an earth-facing orientation).

Thrusters 404-415 may be controlled to achieve a specified movement of satellite 400, which may include linear and/or rotational movement. Suitable control circuits may be connected to thrusters 404-415 to provide signals to cause thrusters 404-415 to fire in a thruster firing pattern to thereby produce thrust that achieves the specified movement.

Figure 5A:
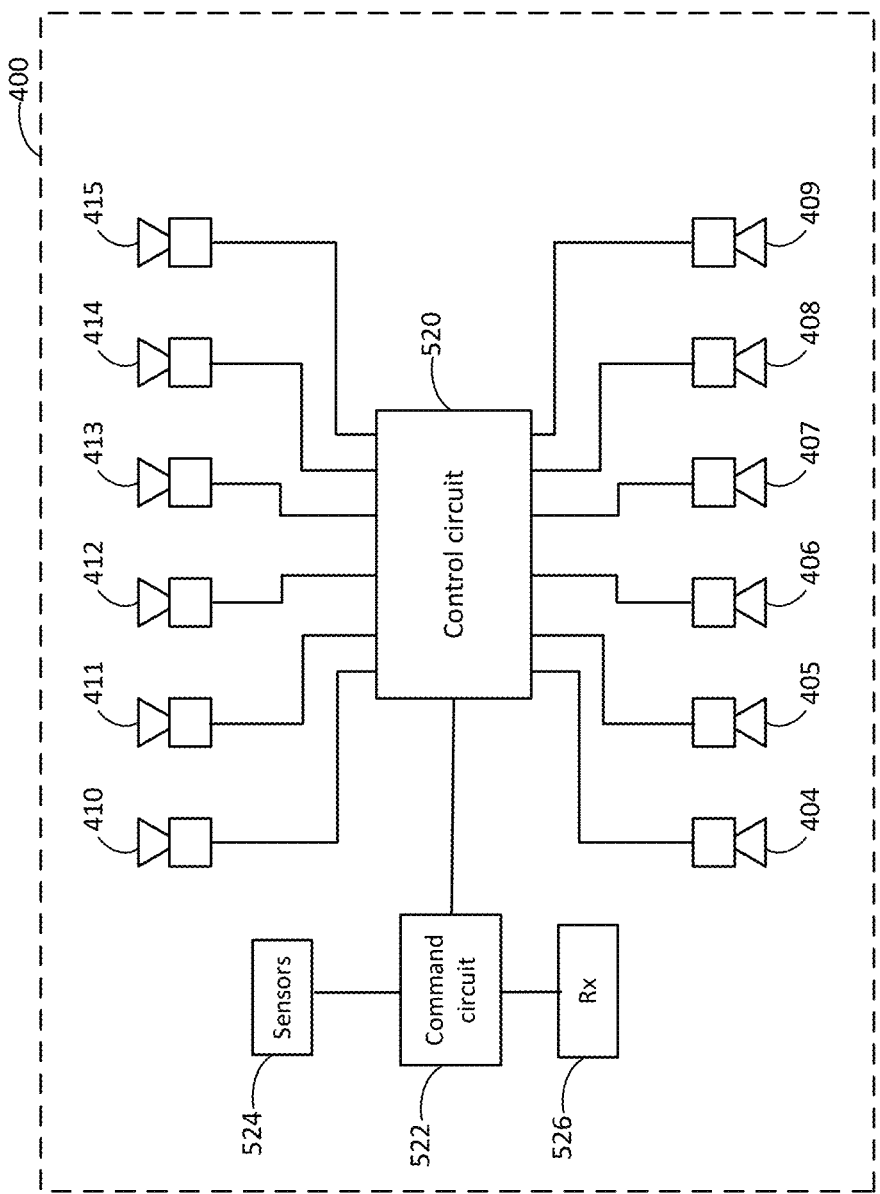
FIGS. 5A-C illustrate aspects of a satellite with thrusters and corresponding control circuits.

FIG. 5A shows a schematic illustration of thrusters 404-415 connected to control circuit 520 in satellite 400. Control circuit 520 is also connected to command circuit 522, which sends commands to control circuit 520. For example, command circuit 522 may send a command that includes a specified movement including specified changes in position and/or orientation. For example, command circuit 522 may receive positional information from sensors 524 (e.g. gyroscopic or other sensors for location/orientation sensing) and may use such positional information to determine what movement or movements would achieve a desired position, velocity, orientation and/or rotational orientation and/or rotational velocity. For example, command circuit 522 may calculate a trajectory for satellite 400 to change its location and/or orientation and may generate a series of commands to achieve such a trajectory with each command including a specified movement. Command circuit 522 is also connected to receiver 526 and may receive input from an external source (e.g. from a ground station or another satellite) that it may use to determine what movement is needed. For example, the location and/or orientation of a satellite may be monitored from earth and corresponding location/orientation information may be sent to receiver 526. Receiver 526 may also receive a signal from another satellite. For example, where a service satellite is to dock with a target satellite, signals may be exchanged to facilitate docking (e.g. signals with respective position/orientation information). In some cases, command circuit 522 may send commands infrequently (e.g. only when some deviation from a desired location/orientation is detected). In some cases, command circuit 522 may send commands frequently (e.g. when accurate maneuvering is needed for docking with another satellite or for another purpose). Sensors 524 and/or receiver 526 may provide data regarding location/position frequently to provide rapid feedback so that new commands are generated to reflect up-to-date data. For example, a time interval (sample period) of less than two hundred milliseconds (200 ms) or less than 150 ms (e.g. 128 ms) may be used to provide fine control of satellite movement.

When control circuit 520 receives a command from command circuit 522 with a specified movement for satellite 400, it may select a thruster firing pattern for thrusters 404-415 to achieve the specified movement. A thruster firing pattern may include firing one or more thruster for selected periods of time to generate thrust to cause the specified movement. Selecting and implementing an appropriate thruster firing pattern may be challenging in a short timeframe (e.g. less than 200 ms or 150 ms). Because propellant is generally limited on a satellite, it is generally desirable to select a firing pattern that is propellant efficient and an appropriate thruster firing pattern may be selected for propellant efficiency, which may make selection of a thruster firing pattern more challenging.

Figures 5B, 5C:
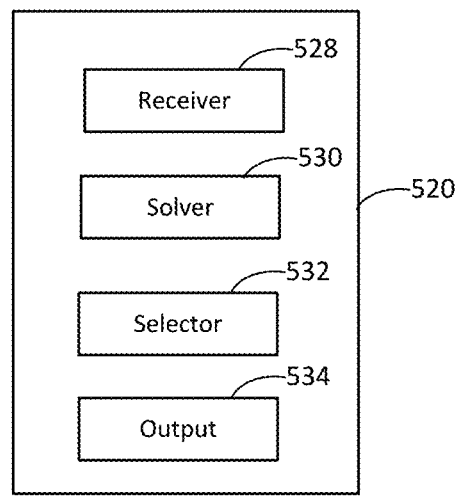

FIG. 5B illustrates an example implementation of control circuit 520 which may be used to select and implement a thruster firing pattern in response to a command. Control circuit 520 includes receiver circuit 528 (e.g. interface circuit) which is configured to receive a command (e.g. command from command circuit 522) including a specified movement for satellite 400. Control circuit 520 also includes solver circuit 530 which is configured to generate thruster firing solutions to achieve the specified movement of satellite 400. Selector circuit 532 is configured to select one of the thruster firing solutions generated by solver circuit 530 (there may be many such solutions). Output circuit 534 is configured to generate output signals to thrusters 404-415 to cause them to fire and thus implement the thruster firing solution selected by selector circuit 532.

FIG. 5C illustrates an example of a matrix equation that expresses the relationship between movement of satellite 400 and thruster firing times for twelve thrusters (thrusters 404-415). Movement is expressed as change in velocity in three dimensions, e.g. in the X, Y, and Z directions ($dv_x$, $dv_y$, and $dv_z$ respectively), and change in angular velocity about three axes, e.g. about the X, Y, and X axes ($d\omega_x$, $d\omega_y$, and $d\omega_z$ respectively) on the left of the equation. Thruster firing solutions are on the right and are expressed as twelve firing times ($T_1$ to $T_{12}$) with each firing time corresponding to a respective thruster (e.g. $T_1$ corresponding to thruster 404, $T_2$ corresponding to thruster 405, and so on). The 6×12 matrix ($M_{6 \times 12}$) represents the relationship between movement and thruster firing times and may depend on the physical properties of the satellite (e.g. mass and distribution of mass about a center of gravity) and the arrangement and thrust of the thrusters (e.g. locations, orientations and thrust generated when thrusters fire). This matrix may be found from calculation, computer modeling, experimentation, some combination of these approaches, or otherwise (e.g. using mass and location of satellite components including thrusters).

In general, when solver circuit 530 solves the equation of FIG. 5C for a given command received by receiver 528, solver 530 provides multiple solutions to selector circuit 532 (e.g. there may be multiple thruster firing patterns that may be used to achieve a specified movement). Selector circuit 532 then selects one of these thruster firing solutions as a thruster firing pattern to implement. For example, selector circuit 532 may select a thruster firing solution that has the lowest total propellant consumption. In general, propellant consumption may be estimated from the total firing time across all thrusters in a thruster firing solution (e.g. $T_1+T_2+T_3+\ldots T_{12}$). Selector circuit 532 may add up the total thruster firing time for each thruster firing solution provided by solver circuit 530 and may compare total thruster firing times to select the thruster firing solution with the lowest total thruster firing time as the thruster firing pattern to be implemented by output circuit 534 and thrusters 404-415.

In some cases, it may be undesirable, difficult, or impossible to fire a thruster for a very short period of time. Where a selected firing pattern includes one or more thruster firing time that is very short (e.g. less than some minimum thruster firing time), use of such a firing pattern may result in movement that is not as expected, e.g. because when one or more thruster receives a signal to fire for less than the minimum thruster firing time, it does not fire, or does not adequately fire, and therefore does not produce adequate thrust. In some cases, even where short thruster firing times are possible, firing thrusters for very short periods may damage a thruster over the long-term so that it may be beneficial to set a minimum thruster firing time to avoid short firing times. Such time constraints may be problematic where finely controlled movement is needed and shorter firing times may called for (e.g. docking a service satellite and a target satellite).

Figure 6:
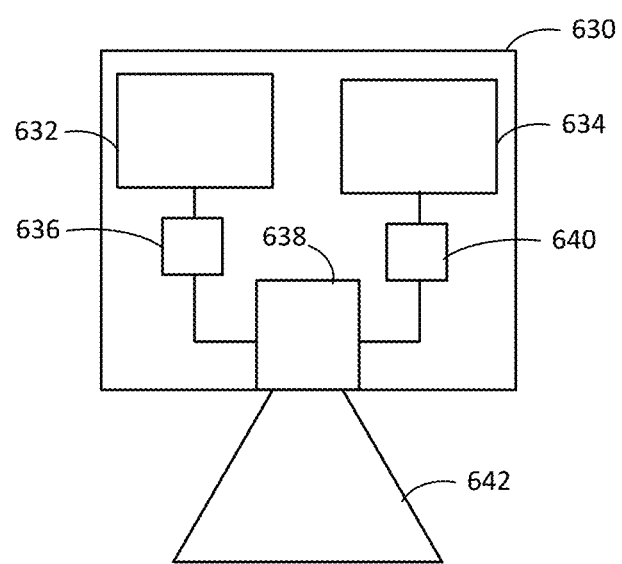
FIG. 6 illustrates an example of a thruster.

FIG. 6 illustrates an example of a thruster 630 (e.g. any of thrusters 404-415) that uses a liquid fuel and a liquid oxidizer. Liquid fuel is stored in fuel tank 632 and liquid oxidizer is stored in oxidizer tank 634. A fuel valve 636 connects fuel tank 632 to combustion chamber 638. An oxidizer valve 640 connects oxidizer tank 634 to combustion chamber 638. When thruster 630 fires (e.g. when a signal is received to fire for a specified period according to a firing pattern), fuel valve 636 and oxidizer valve 640 open and fuel and oxidizer enter combustion chamber 638 where they react (combust) and cause exhaust gasses to be expelled through nozzle 642 thereby providing thrust. Fuel and oxidizer are generally used together to generate thrust and propel the satellite and may be referred to collectively as "propellant." In some cases, attempting to fire a thruster such as thruster 630 for a short period may be problematic. For example, fuel valve 636 and oxidizer valve 640 may take some time to open and close and may not be able to fully open if there is insufficient on-time commanded. In some cases, opening valves for a short period may result in low flow of fuel and/or oxidizer so that it does not reach combustion chamber 638 and remains in lines between valves and combustion chamber 638 where it may react and cause damage (at least in the long term). Thus, a thruster may be unable to effectively fire for less than a minimum time and attempting to fire it for less than this minimum (e.g. by signaling a firing time less than the minimum) may cause various problems. Setting a minimum thruster firing time for controlling such thrusters may avoid some of these problems by ensuring that any signal to fire a thruster is for a sufficient period and therefore when a corresponding thruster fires it does so for a long enough period for the hardware to operate adequately (e.g. for valves to fully open and for fuel and oxidizer to reach and combust in combustion chamber 638). However, selecting and implementing a thruster firing pattern that complies with such minimum thruster firing times, especially in a short time period, may be challenging.

While thruster 630 is an example of a thruster that may be used in satellite 400 (e.g. as one or more of thrusters 404-415) other thrusters may also be used and may also have hardware features that make a minimum firing time beneficial. For example, monopropellant thrusters, hall effect thrusters, ion thrusters, electrothermal thrusters, electromagnetic thrusters, and other thrusters may have different features that may be accommodated with different minimum thruster firing times (note that the term "thruster firing time" is used for all thrust generation and is not limited to a combustion-type reaction). While the present examples are based on all thrusters 404-415 being identical or substantially identical and therefore having the same minimum thruster firing time, this may not always be the case. In some cases, different thrusters may be used in the same satellite and different minimum thruster firing times may be applied accordingly. Minimum thruster firing time may determined from component specifications (e.g. valve switching times), computer modeling, experimental data, or otherwise. An example of a minimum thruster firing time may be less than twenty milliseconds (20 ms), e.g. 16 ms.

Figure 7A:
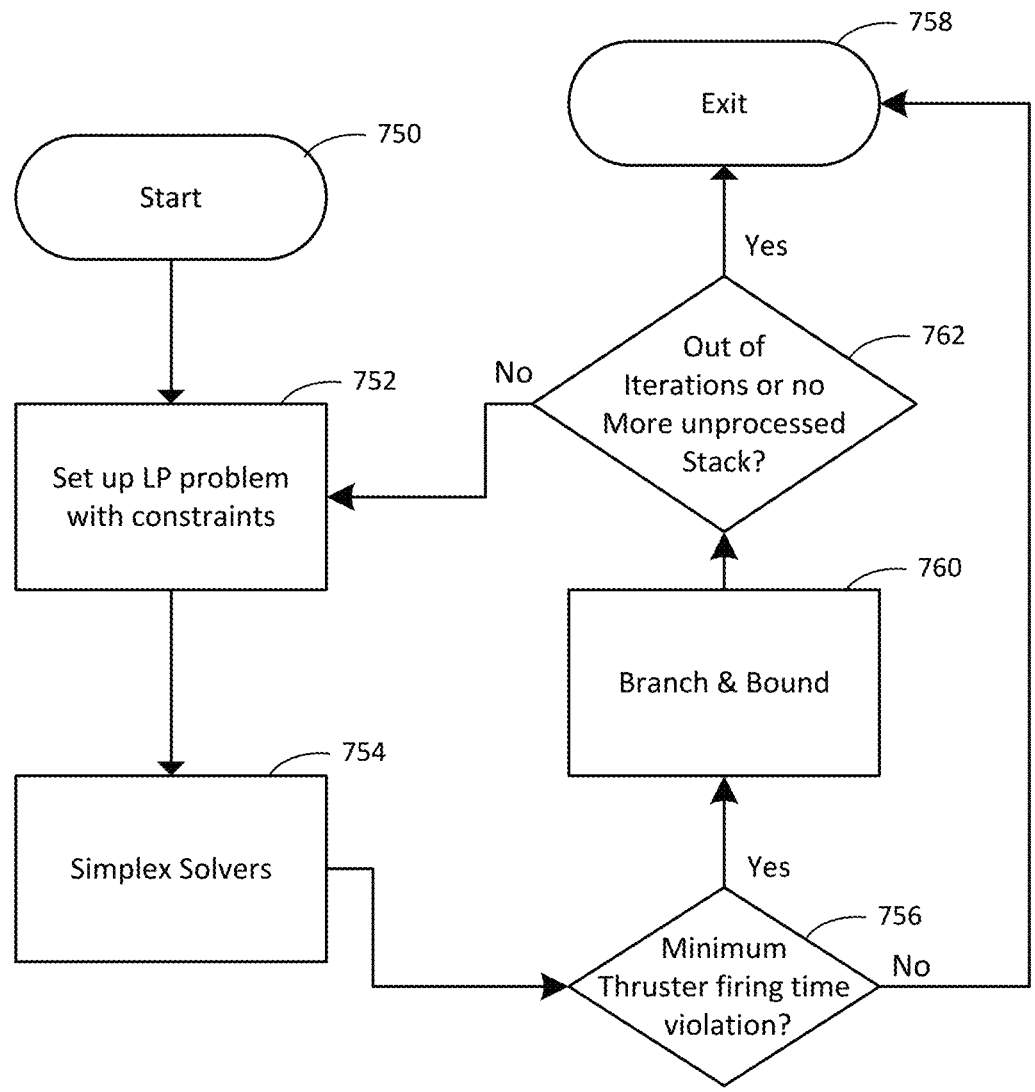
FIGS. 7A-B illustrate an example of selection of a thruster firing pattern.

FIG. 7A illustrates an example of a method of obtaining a thruster firing pattern that complies with a minimum thruster firing time. The method starts 750 (e.g. when a command is received with a specified movement) and a linear program (LP) problem is set up with constraints 752 (e.g. the problem may be solving the equation of FIG. 5C with a minimum thruster fire time constraint). Then solutions to the LP problem are generated using simplex solvers 754 (e.g. solver circuit 530 and selector circuit 532) to generate a thruster firing pattern. A determination 756 is then made as to whether there is a minimum thruster firing time violation in the thruster firing pattern. If there is no minimum thruster firing time violation, then the thruster firing pattern may be used and the selection ends 758 (thruster firing pattern is compliant). If there is a minimum thruster firing time violation, then the non-compliant thruster firing pattern may be subject to a branch and bound step 760 (or series of steps). This may continue over multiple iterations. A determination is made as to whether the system is out of iterations (e.g. last iteration) or there are no more unprocessed LP problems in a stack 762. As long as there are unprocessed LP problems in the stack, the problem or problems are set up with constraints 752 and another iteration is performed. Once the system is out of iterations and there are no more unprocessed LP problems in the stack, the selection ends 758 (e.g. ends without thruster firing pattern that complies with the minimum thruster firing time).

Figure 7B:
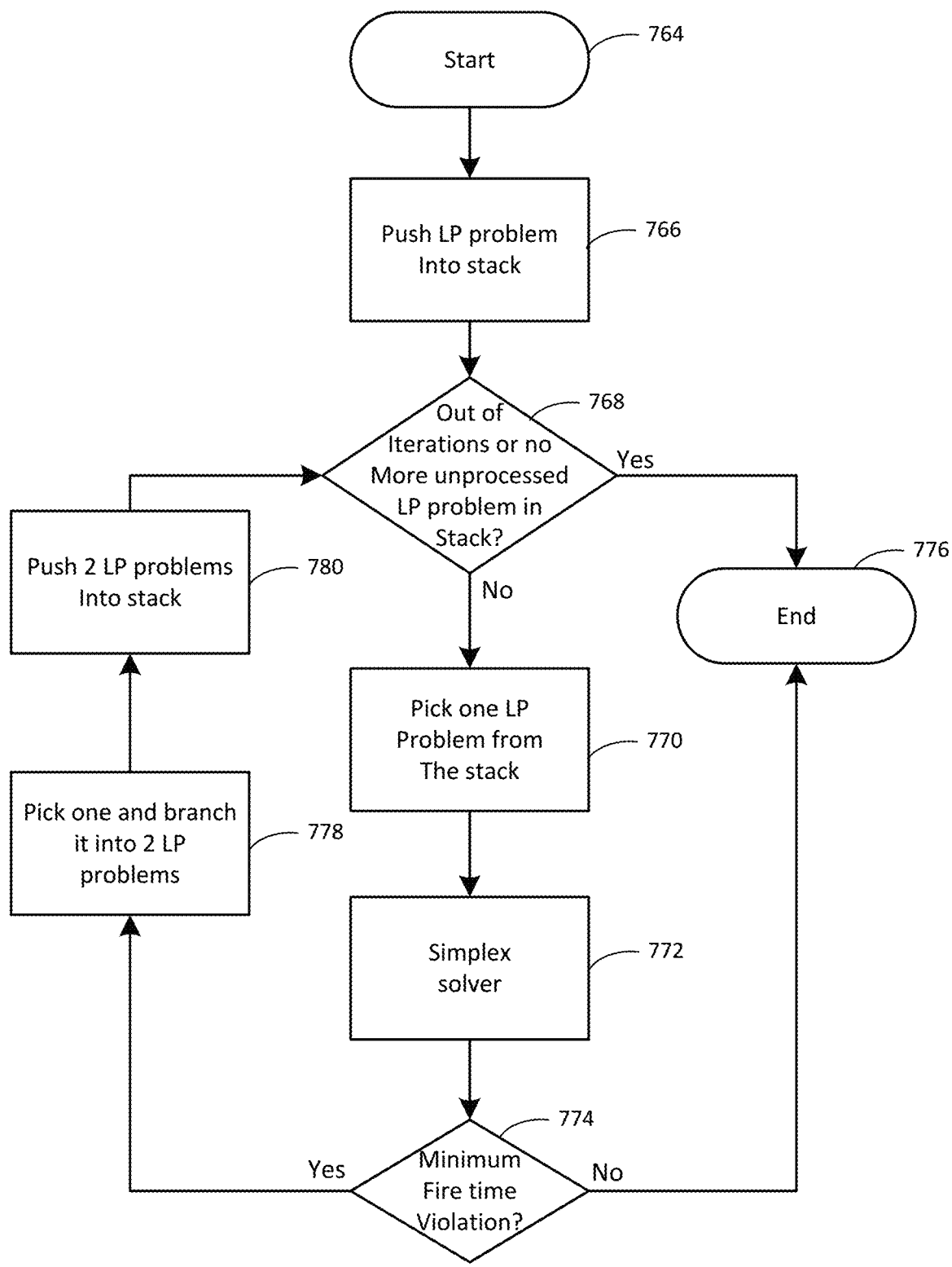

FIG. 7B illustrates the method of FIG. 7A with further detail of branch and bound step 760. When a minimum thruster firing time violation is found (e.g. step 756), a branch and bound operation starts 764 and the problem is pushed into an LP problem stack 766. A determination 768 is made as to whether the system is out of iterations or there are no more unprocessed LP problems in the stack. If there are more unprocessed LP problems, then the system picks one LP problem from the stack 770 and applies the simplex solver 772 to the LP problem to obtain a thruster firing solution. A determination 774 is made as to whether this solution includes a minimum thruster firing time violation. If there is no minimum thruster firing time violation, then this solution may be used (is compliant) and selection ends 776. If there is a minimum thruster firing time violation, then the system picks a violation and branches into two LP problems 778. In one of these LP problems, the violation is replaced with zero and in the other LP problem, the violation is required to be greater than the minimum thruster firing time. These two LP problems are pushed into the stack 780 where they may be picked up at step 770. Thus, an LP problem may branch multiple times until a compliant thruster firing pattern is found (with no minimum thruster firing time violations) or there are no more LP problems in the stack.

Implementing such a branch and bound system includes maintaining a stack of LP problems and solving them, which may require significant resources (e.g. RAM or other memory to maintain the stack and/or processing capacity to solve the LP problems). The number of iterations may vary and may be difficult to solve rapidly in some cases (e.g. no compliant thruster firing solution may be found within a time limit because of the large number of LP problems to solve).

Figure 8:
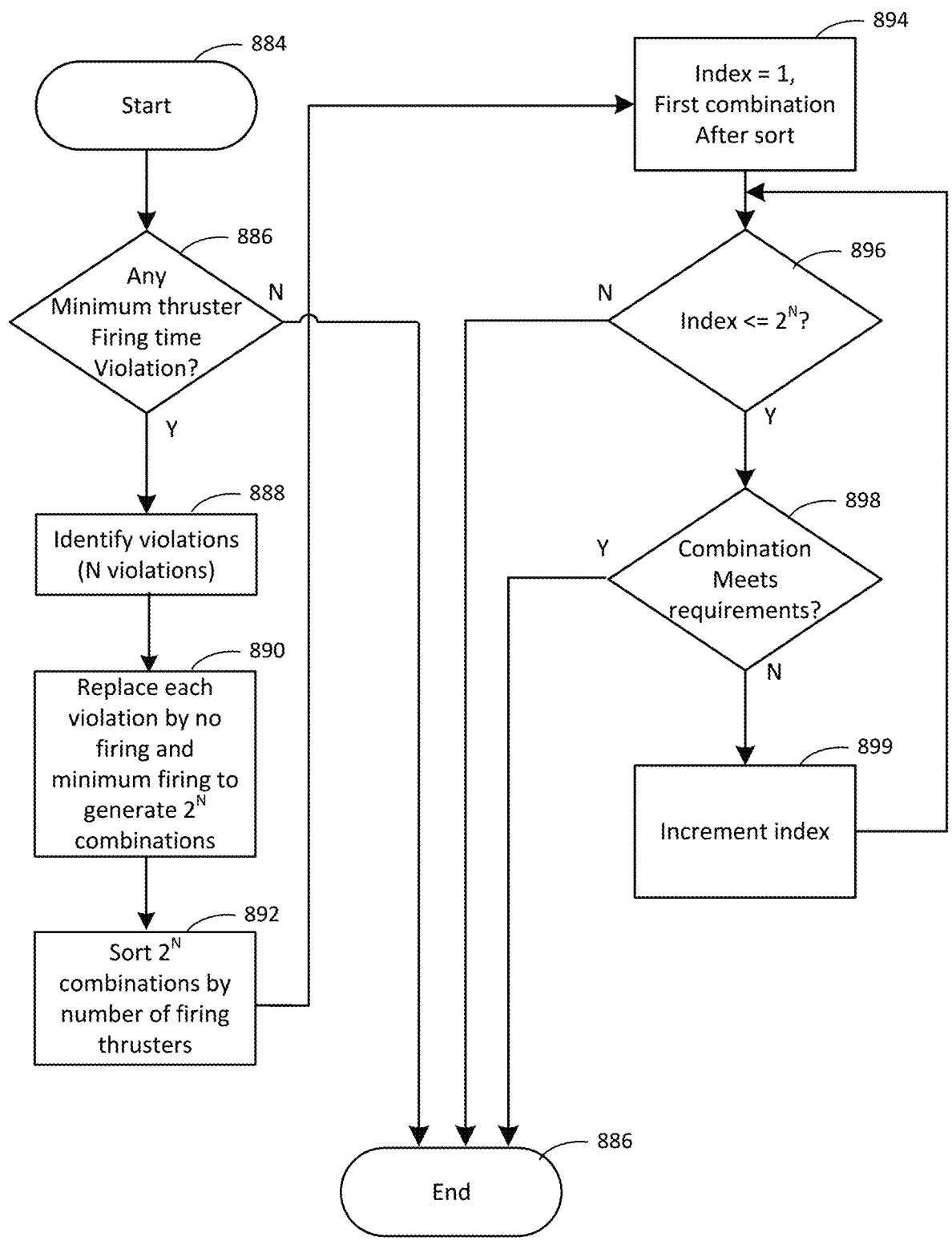
FIG. 8 illustrates another example of selection of a thruster firing pattern.

An alternative to the branch and bound approach of FIGS. 7A-B is illustrated in FIG. 8, which shows a method that starts 884 when one or more thruster firing pattern is obtained (e.g. a thruster firing solution to the equation of FIG. 5C that has low total thruster firing time). A determination is made 886 as to whether there are any minimum thruster firing time violations in the thruster firing pattern (e.g. if minimum thruster firing time is 16 ms, any thruster firing time less than 16 ms is a violation). If there are no such violations, then the thruster firing pattern is compliant (complies with the minimum thruster firing time requirement) and may be used, so selection ends 886. If there are minimum thruster firing time violations, then the thruster firing pattern is a non-compliant thruster firing pattern and the violations are identified 888 (N violations are identified corresponding to N thrusters that are assigned a thruster firing time less than the minimum thruster firing time). Combinations without violations (compliant thruster firing patterns) are then generated by replacing each violation by no firing and minimum firing to generate $2^N$ combinations 890. For example, with two violations (e.g. less than 16 ms) in a thruster firing pattern, each violation is replaced by 0 and 16 ms to give four combinations (0 ms, 0 ms) (0 ms, 16 ms) (16 ms, 0 ms) (16 ms, 16 ms) while all other thruster firing times remain unchanged. For N violations, this generates $2^N$ combinations, which are sorted by the number of firing thrusters 892 (e.g. from a combination with none of the N thrusters firing (all violations replaced by zero), to combinations with one firing thruster, two firing thrusters, and so on up to all N firing (all violations replaced by minimum firing time)). These combinations are indexed with index=1 corresponding to the first combination after sort 894 (combination with all violations replaced by zero), which corresponds to the order of increasing total thruster firing time (lowest to highest total thruster firing time corresponding to least to most propellant consumption). A determination is made 896 as to whether the present index is less than or equal to $2^N$. If the present index is less than or equal to $2^N$, a further determination is made as to whether the combination meets requirements 898. For example, the combination (thruster firing pattern) may be required to generate a movement that is within a predetermined range of the specified movement indicated by a command. If the combination meets the requirements, then it may be used and selection ends 886. If it does not meet requirements, then the index is incremented 899 so that the next combination is checked. This continues until a combination meets requirements or the last combination is reached. By proceeding in order from lowest to highest total thruster firing time, the first combination to meet requirements at step 898 has the lowest propellant use of any combination (e.g. any subsequent combinations that might meet requirements would have higher propellant consumption). In some cases, where accuracy is prioritized over propellant consumption, all combinations may be checked to see how close their respective movements are to the specified movement so that the combination providing the closest movement may be chosen (even if it requires more propellant).

While a compliant thruster firing pattern is obtained by this method, the compliant thruster firing pattern may not be a thruster firing solution (e.g. may not be a solution to the equation of FIG. 5C). However, the thruster firing pattern is close to a thruster firing solution (within a predetermined range) and a close compliant thruster firing pattern may be obtained relatively quickly and efficiently compared with obtaining a thruster firing solution (e.g. solution to equation of FIG. 5C) that also is compliant. A predetermined range used for step 898 may be received with a command (e.g. the command may specify an acceptable range for one or more of $dv_x$, $dv_y$, $dv_z$, $d\omega_x$, $d\omega_y$, and $d\omega_z$). In some cases, the requirements, or range, may be stored in control circuits prior to receiving the command (e.g. control circuits may be configured to apply the same requirements or range to all specified movements). Requirements may be given as individual ranges for each of $dv_x$, $dv_y$, $dv_z$, $d\omega_x$, $d\omega_y$, and $d\omega_z$ or some range that is based on total deviation (e.g. the sum of individual deviations from $dv_x$, $dv_y$, $dv_z$, $d\omega_x$, $d\omega_y$, and $d\omega_z$) or some other combination of individual deviations.

Figure 9A:
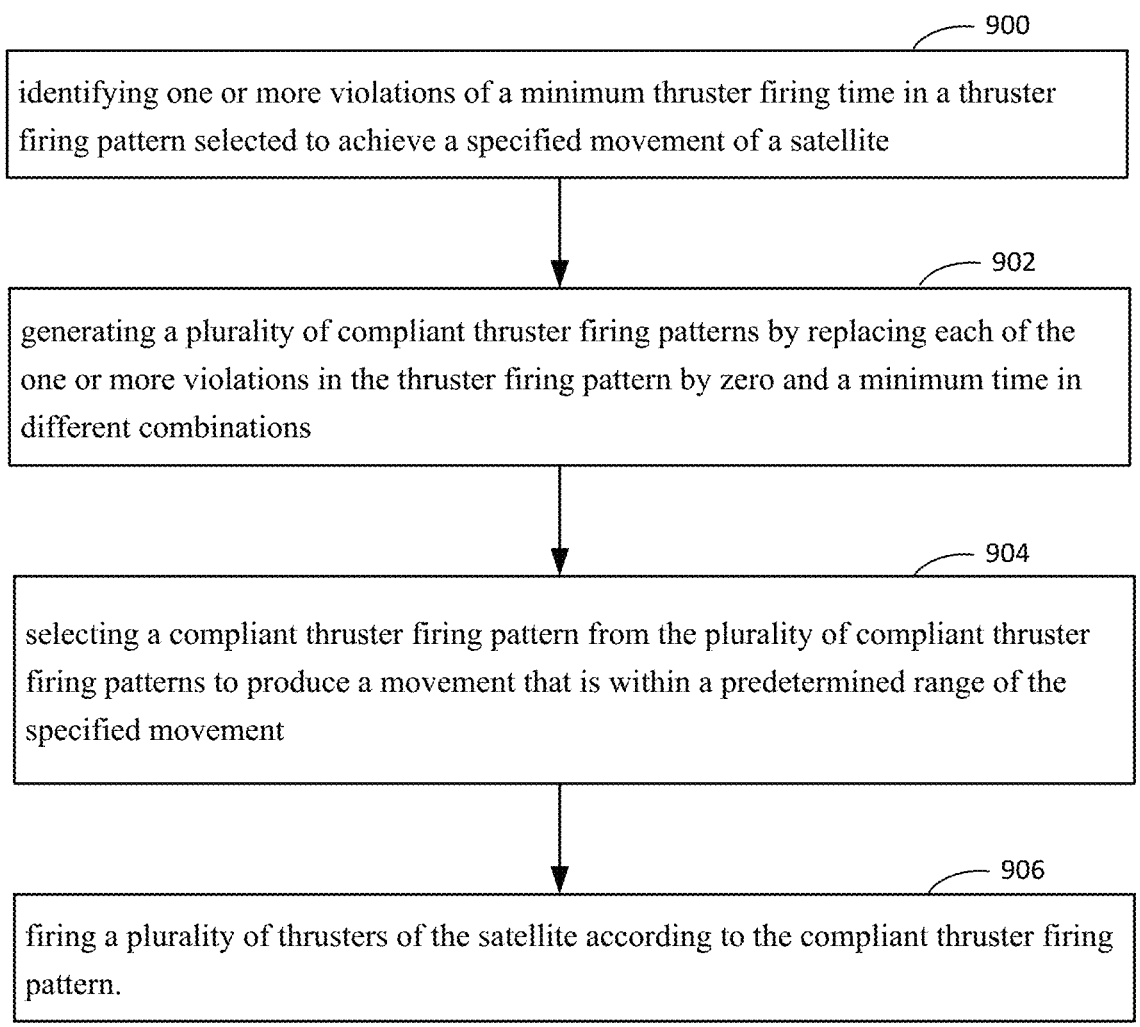
FIGS. 9A-B illustrate examples of selection of a thruster firing pattern and firing thrusters according to the pattern.

FIG. 9A further illustrates a method according to the present technology. The method includes identifying one or more violations of a minimum thruster firing time in a thruster firing pattern selected to achieve a specified movement of a satellite 900. For example, such a non-compliant thruster firing pattern may be selected from thruster firing solutions that are calculated to achieve the specified movement (e.g. selected based on propellant consumption). The method further includes generating a plurality of compliant thruster firing patterns by replacing each of the one or more violations in the thruster firing pattern by zero and a minimum time in different combinations 902 and selecting a compliant thruster firing pattern from the plurality of compliant thruster firing patterns to produce a movement that is within a predetermined range of the specified movement 904. For example, the equation shown in FIG. 5C may be used to determine the movement produced by the compliant thruster firing pattern and this movement may be compared with the specified movement to see if it is within a predetermined range of the specified movement. The method includes firing a plurality of thrusters of the satellite according to the compliant thruster firing pattern 906.

Figure 9B:
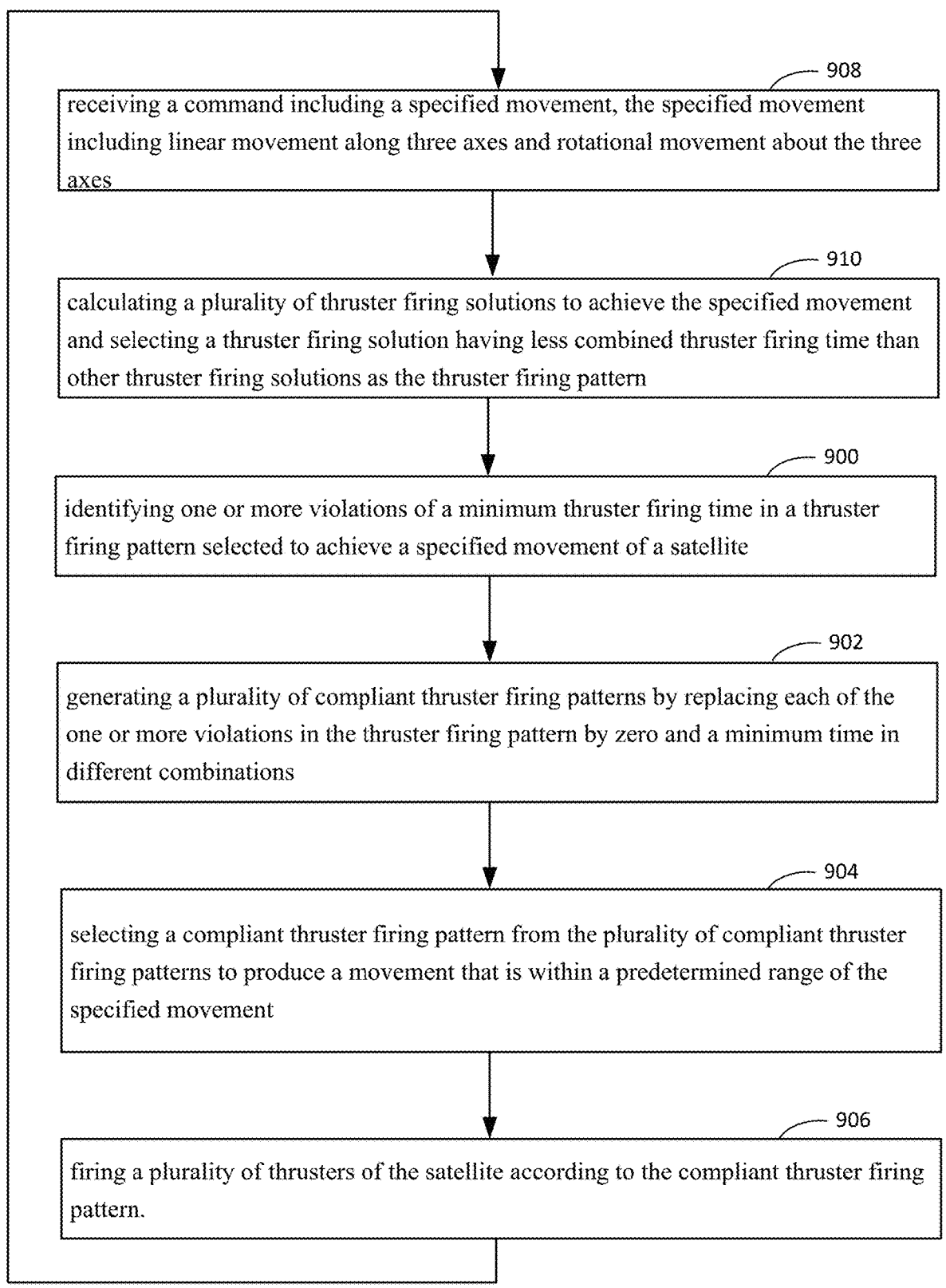

FIG. 9B further illustrates how the method of FIG. 9A may be used in a satellite and includes additional steps. The method includes receiving a command including a specified movement, the specified movement including linear movement along three axes and rotational movement about the three axes 908 and calculating a plurality of thruster firing solutions to achieve the specified movement and selecting a thruster firing solution having less combined thruster firing time than other thruster firing solutions as the thruster firing pattern 910 (e.g. by solving the equation of FIG. 5C and selecting a solution with the lowest total thruster firing time as the thruster firing pattern). Violations of the minimum firing time are then identified (step 900), compliant thruster firing patterns are generated (step 902), a compliant thruster firing pattern is selected (step 904), and the thrusters are fired (step 906) as in FIG. 9A. Then another command is received and the steps are repeated. This cycle may be repeated frequently (e.g. at a frequency greater than once every 150 ms, e.g. every 128 ms) for a plurality of commands. In some cases, steps may not be performed sequentially as illustrated. For example, there may be some overlap between different steps, e.g. while firing thrusters according to the compliant firing pattern, control circuits may receive a subsequent command and begin a new iteration (e.g. step 906 of one iteration may continue while steps 908, 910, 900 etc. may proceed for a subsequent iteration).

The methods illustrated in FIGS. 8 and 9A-B are relatively simple and may be rapidly performed. For example, the methods of FIGS. 8 and 9A-B may be more rapidly performed than the methods illustrated in FIGS. 7A-B and may require fewer resources (e.g. less RAM and/or less processing power). This may facilitate fine movement of a satellite (e.g. movement that uses short sampling times and sends a large number of commands to make fine adjustments) with low propellant use and efficient use of resources including RAM and processor capacity.

Figure 10:
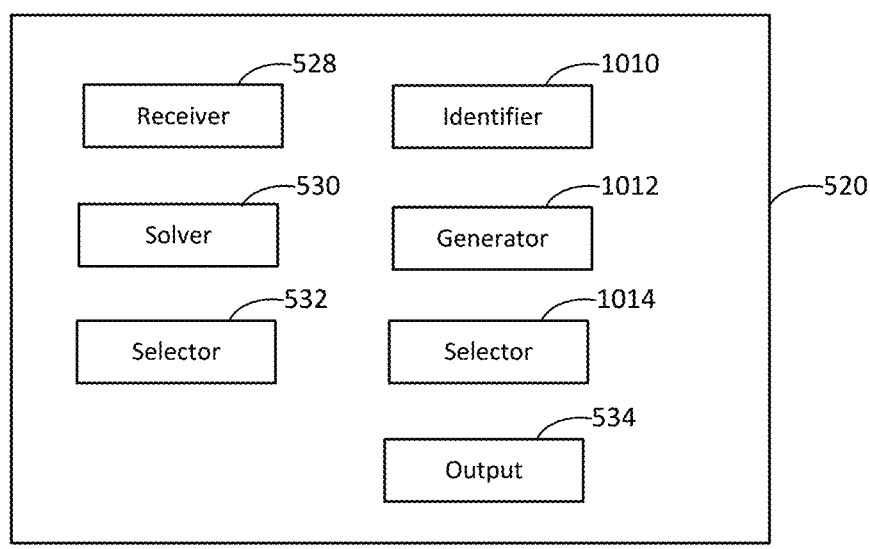
FIG. 10 illustrates an example of control circuits for moving a satellite.

FIG. 10 illustrates an example of control circuit 520 (satellite movement control circuit) which is configured to implement aspects of the present technology. For example, control circuit 520 of FIG. 10 may implement methods illustrated in FIGS. 8-9B. Control circuit 520 includes receiver circuit 528, solver circuit 530 and selector circuit 532, which were previously described with respect to FIG. 5B and may be configured to respectively receive a command that includes a specified movement, generate corresponding thruster firing solutions, and select a thruster firing solution that has less combined thruster firing time than the others as the thruster firing pattern. In addition, control circuit 520 includes identifier circuit 1010, which may be configured to identify one or more violations of a minimum thruster firing time in the thruster firing pattern selected by selector circuit 532 and includes generator circuit 1012, which may be configured to generate a plurality of compliant thruster firing patterns by replacing each of the one or more violations in the thruster firing pattern by zero and a minimum time in different combinations. Control circuit 520 also includes selector circuit 1014, which may be configured to select a compliant thruster firing pattern from the plurality of compliant thruster firing patterns to produce a movement that is within a predetermined range of the specified movement. For example, selector circuit 1014 may calculate the movement generated by compliant thruster firing patterns to see if they are within a predetermined range of the specified movement. Control circuit 520 further includes output circuit 534, which is configured to implement a compliant thruster firing pattern selected by selector circuit 1014 by sending signals to cause firing of a plurality of thrusters of the satellite according to the compliant thruster firing pattern.

Control circuit 520 may be formed as multiple separate circuits, for example, as separate Integrated Circuits (ICs) on a Printed Circuit Board (PCB), or may be formed as a single circuit, for example, as an integrated circuit (IC) such as an Application Specific Integrated Circuit (ASIC), Programmable Logic Device (PLD), Field Programmable Gate Array (FPGA) or other IC. Control circuit 520 may be implemented by a processor executing software or firmware that configures circuits of the processor to perform corresponding functions. Such a processor may be dedicated to satellite movement control or may have other functions in addition to satellite movement control. Control circuit 520 may be formed of some combination of dedicated circuits and programmable or configurable components.

Certain embodiments of the present technology are directed to a satellite. In accordance with an embodiment, the satellite includes: a plurality of thrusters disposed about the satellite, each of the plurality of thrusters having a minimum thruster firing time; and a control circuit connected to the plurality of thrusters, the control circuit configured to identify violations of the minimum thruster firing time in a non-compliant thruster firing pattern selected to achieve a specified movement, generate a plurality of compliant thruster firing patterns by replacing each of the violations of the non-compliant thruster firing pattern by zero and a minimum time in different combinations, select a compliant thruster firing pattern from the plurality of compliant thruster firing patterns to produce a satellite movement that is within a predetermined range of the specified movement, and cause the plurality of thrusters to fire according to the compliant thruster firing pattern.

The plurality of thrusters may comprise twelve thrusters. The plurality of thrusters may be arranged to generate linear movement along three dimensions and generate rotational movement about three axes. The control circuit may be further configured to select the non-compliant thruster firing pattern from a plurality of thruster firing solutions to achieve the specified movement, the non-compliant thruster firing pattern having lower total thruster firing time than other thruster firing solutions. The control circuit may be further configured to calculate the plurality of thruster firing solutions from a matrix that is based on mass and location of satellite components and on locations and orientations of the plurality of thrusters. The control circuit may be further configured to receive a command that specifies the specified movement as velocity in three dimensions and rotational velocity about three axes. The control circuit may be configured to receive a plurality of commands, each command corresponding to a time interval, and for each of the plurality of commands, calculate a plurality of thruster firing solutions, select a thruster firing solution having lower total thruster firing time than other thruster firing solutions, identify violations of the minimum thruster firing time in non-compliant thruster firing patterns, generate a plurality of compliant thruster firing patterns by replacing each of the violations of the non-compliant thruster firing patterns by zero and a minimum time in different combinations, select a compliant thruster firing pattern from the plurality of compliant thruster firing patterns to produce a satellite movement that is within a predetermined range of the specified movement, and cause the plurality of thrusters to fire according to the compliant thruster firing pattern. The time interval may be some predetermined period that may be less than 200 milliseconds. The minimum thruster firing time may be some fraction of the predetermined period, e.g. $\frac{1}{10}$ or less than 20 milliseconds.

An example of a method of moving a satellite includes identifying one or more violations of a minimum thruster firing time in a thruster firing pattern selected to achieve a specified movement of a satellite; generating a plurality of compliant thruster firing patterns by replacing each of the one or more violations in the thruster firing pattern by zero and a minimum time in different combinations; selecting a compliant thruster firing pattern from the plurality of compliant thruster firing patterns to produce a movement that is within a predetermined range of the specified movement; and firing a plurality of thrusters of the satellite according to the compliant thruster firing pattern.

The method may include receiving a command including the specified movement, the specified movement including linear movement along three axes and rotational movement about the three axes. The method may include calculating a plurality of thruster firing solutions to achieve the specified movement and selecting a thruster firing solution having less combined thruster firing time than other thruster firing solutions as the thruster firing pattern. The command may be one of a plurality of received commands, each received command corresponding to a time interval, and calculating the plurality of thruster firing solutions, selecting the thruster firing pattern, identifying one or more violations of the minimum thruster firing time, generating the plurality of compliant thruster firing patterns, selecting the compliant thruster firing pattern, and firing the plurality of thrusters may be performed for each of the plurality of received commands. The time interval may be some predetermined period P (e.g. less than 200 milliseconds) such that selecting a compliant thruster firing pattern and firing the plurality of thrusters according to the compliant thruster firing pattern occurs at a frequency of 1/P (e.g. greater than once every 200 milliseconds).

An example of a satellite movement control circuit includes an identifier circuit configured to identify violations of a minimum thruster firing time in a non-compliant thruster firing pattern selected to achieve a specified movement of a satellite; a generator circuit configured to generate a plurality of compliant thruster firing patterns by replacing each of the violations of the non-compliant thruster firing pattern by zero and a minimum time in different combinations; and a selector circuit configured to select a compliant thruster firing pattern from the plurality of compliant thruster firing patterns to produce a satellite movement that is within a predetermined range of the specified movement.

The satellite movement control circuit may include a receiver circuit configured to receive a command that includes the specified movement as velocity in three dimensions and rotational velocity about three axes. The satellite movement control circuit may include a solver circuit configured to generate a plurality of thruster firing solutions to achieve the specified movement. The satellite movement control circuit may include a selector circuit configured to select one of the thruster firing solutions generated by the solver circuit as a thruster firing pattern for the identifier circuit. The satellite movement control circuit may be located in a satellite and may be connected to a plurality of thrusters in the satellite. The minimum thruster firing time may be less than twenty milliseconds and the selector circuit may be configured to select a compliant thruster firing pattern at a frequency greater than once every two hundred milliseconds.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite comprising:
    a plurality of thrusters disposed about the satellite, each of the plurality of thrusters having a minimum thruster firing time; and
    a control circuit connected to the plurality of thrusters, the control circuit configured to:
        identify violations of the minimum thruster firing time in a non-compliant thruster firing pattern selected to achieve a specified movement, each violation identified by a thruster firing time that is less than the minimum thruster firing time,
        generate a plurality of compliant thruster firing patterns by replacing each of the violations of the non-compliant thruster firing pattern with zero and the minimum thruster firing time in different combinations,
        select a compliant thruster firing pattern from the plurality of compliant thruster firing patterns to produce a satellite movement that is within a predetermined range of the specified movement, and
        cause the plurality of thrusters to fire according to the selected compliant thruster firing pattern.

2. The satellite of claim 1 wherein the plurality of thrusters comprises twelve thrusters.

3. The satellite of claim 1 wherein the plurality of thrusters are arranged to generate linear movement along three dimensions and generate rotational movement about three axes.

4. The satellite of claim 1 wherein the control circuit is further configured to select the non-compliant thruster firing pattern from a plurality of thruster firing solutions, each thruster firing solution comprising a thruster firing pattern, to achieve the specified movement, the non-compliant thruster firing pattern having lower total thruster firing time than all other thruster firing solutions of the plurality of thruster firing solutions.

5. The satellite of claim 4 wherein the control circuit is further configured to calculate the plurality of thruster firing solutions from a matrix that is based on mass and location of satellite components and on locations and orientations of the plurality of thrusters.

6. The satellite of claim 5 wherein the control circuit is further configured to receive a command that specifies the specified movement as velocity in three dimensions and rotational velocity about three axes.

7. The satellite of claim 6 wherein the control circuit is configured to receive a plurality of commands, each command corresponding to a time interval, and for each of the plurality of commands, calculate a plurality of thruster firing solutions, select a thruster firing solution having lower total thruster firing time than any other thruster firing solution of the plurality of thruster firing solutions, identify violations of the minimum thruster firing time in non-compliant thruster firing patterns, generate a plurality of compliant thruster firing patterns by replacing each of the violations of the non-compliant thruster firing patterns with zero and the minimum thruster firing time in different combinations, select a compliant thruster firing pattern from the plurality of compliant thruster firing patterns to produce a satellite movement that is within a predetermined range of the specified movement, and cause the plurality of thrusters to fire according to the selected compliant thruster firing pattern.

8. The satellite of claim 7 wherein the time interval is less than a predetermined period.

9. The satellite of claim 8 wherein the minimum thruster firing time is a predetermined fraction of the predetermined period.

10. A method of moving a satellite, comprising:
identifying one or more violations of a minimum thruster firing time in a thruster firing pattern selected to achieve a specified movement of a satellite, each violation identified by an individual thruster firing time that is less than the minimum thruster firing time;
generating a plurality of compliant thruster firing patterns by replacing each of the one or more violations in the thruster firing pattern with zero and the minimum thruster firing time in different combinations;
selecting a compliant thruster firing pattern from the plurality of compliant thruster firing patterns to produce a movement that is within a predetermined range of the specified movement; and
firing a plurality of thrusters of the satellite according to the selected compliant thruster firing pattern.

11. The method of claim 10 further comprising receiving a command including the specified movement, the specified movement including linear movement along three axes and rotational movement about the three axes.

12. The method of claim 11 further comprising calculating a plurality of thruster firing solutions to achieve the specified movement and selecting a thruster firing solution having less combined thruster firing time than all other thruster firing solutions of the plurality of thruster firing solutions as the thruster firing pattern.

13. The method of claim 12 wherein the command is one of a plurality of received commands, each received command corresponding to a time interval, and wherein calculating the plurality of thruster firing solutions, selecting the thruster firing pattern, identifying one or more violations of the minimum thruster firing time, generating the plurality of compliant thruster firing patterns, selecting the compliant thruster firing pattern, and firing the plurality of thrusters according to the selected compliant thruster firing pattern is performed for each of the plurality of received commands.

14. The method of claim 13 wherein the time interval is a predetermined period P such that selecting a compliant thruster firing pattern and firing the plurality of thrusters according to the selected compliant thruster firing pattern occurs at a frequency of 1/P.

15. A satellite movement control circuit comprising:
an identifier circuit configured to identify violations of a minimum thruster firing time in a non-compliant thruster firing pattern selected to achieve a specified movement of a satellite, each violation identified by an individual thruster firing time that is less than the minimum thruster firing time;
a generator circuit configured to generate a plurality of compliant thruster firing patterns by replacing each of the violations of the non-compliant thruster firing pattern with zero and the minimum thruster firing time in different combinations; and
a selector circuit configured to select a compliant thruster firing pattern from the plurality of compliant thruster firing patterns to produce a satellite movement that is within a predetermined range of the specified movement.

16. The satellite movement control circuit of claim 15 further comprising a receiver circuit configured to receive a command that includes the specified movement as velocity in three dimensions and rotational velocity about three axes.

17. The satellite movement control circuit of claim 16 further comprising a solver circuit configured to generate a plurality of thruster firing solutions to achieve the specified movement.

18. The satellite movement control circuit of claim 17 further comprising an additional selector circuit configured to select one of the thruster firing solutions generated by the solver circuit as a thruster firing pattern for the identifier circuit.

19. The satellite movement control circuit of claim 15 wherein the satellite movement control circuit is located in a satellite and is connected to a plurality of thrusters in the satellite.

20. The satellite movement control circuit of claim 15 wherein the minimum thruster firing time is less than twenty milliseconds and the selector circuit is configured to select a compliant thruster firing pattern more frequently than once every two hundred milliseconds.

* * * * *